(12) United States Patent
Bartlett et al.

(10) Patent No.: US 7,721,579 B2
(45) Date of Patent: May 25, 2010

(54) COLD ROLL FORMING APPARATUS

(75) Inventors: Ross John Bartlett, Mundoolun via Beaudesert (AU); Alexander Noller, Springwood (AU)

(73) Assignee: Smorgon Steel Litesteel Products Pty Ltd, Port Melbourne, Victoria (AU)

( * ) Notice: Subject to any disclaimer, the term of this patent is extended or adjusted under 35 U.S.C. 154(b) by 554 days.

(21) Appl. No.: 11/570,937

(22) PCT Filed: Jun. 22, 2005

(86) PCT No.: PCT/AU2005/000898

§ 371 (c)(1),
(2), (4) Date: Dec. 19, 2006

(87) PCT Pub. No.: WO2006/000019

PCT Pub. Date: Jan. 5, 2006

(65) Prior Publication Data

US 2008/0289390 A1     Nov. 27, 2008

(30) Foreign Application Priority Data

Jun. 23, 2004    (AU)    .............................. 2004903390

(51) Int. Cl.
  *B21D 5/08*    (2006.01)
  *B21D 5/14*    (2006.01)
(52) U.S. Cl. .............................. 72/181; 72/179; 72/178
(58) Field of Classification Search ............ 72/176–181
See application file for complete search history.

(56) References Cited

U.S. PATENT DOCUMENTS

| | | | |
|---|---|---|---|
| 3,391,267 A | | 7/1968 | Rudd |
| 5,163,225 A | * | 11/1992 | Goleby .................... 29/897.35 |
| 5,403,986 A | | 4/1995 | Goleby |
| 5,943,892 A | * | 8/1999 | Hoshi et al. ..................... 72/52 |
| 6,604,397 B2 | * | 8/2003 | Patty et al. ..................... 72/178 |
| 6,644,086 B1 | * | 11/2003 | Bodnar ......................... 72/181 |
| 2002/0170940 A1 | * | 11/2002 | Kazama et al. ............. 228/144 |

FOREIGN PATENT DOCUMENTS

| FR | 2 290 985 | 6/1976 |
|---|---|---|
| WO | WO 2006/000018 | 1/2006 |

* cited by examiner

*Primary Examiner*—Edward Tolan
*Assistant Examiner*—Mohammad Yusuf
(74) *Attorney, Agent, or Firm*—Leydig, Voit & Mayer, Ltd.

(57) ABSTRACT

A cold roll forming mill for the manufacture of hollow flange seam welded beams from a single strip of metal comprises a forming station (1), a seam guide and welding station (2) and a shaping station (3). Either or both of the forming and shaping stations (1, 3) comprise independently supported side engaging roll combinations (7, 12) adapted, in use, to roll either or both of opposite sides of the strip. Adjacent transverse pairs of side engaging roll (7, 12) combinations are selectively movable relative to each other in a transverse direction perpendicular to a direction of travel of said strip through said mill. At least some of the side engaging roll combinations (7, 12) are driven. Drive rolls (6) spaced within the forming and shaping stations (1, 3) engage the strip between opposite edges thereof.

45 Claims, 10 Drawing Sheets

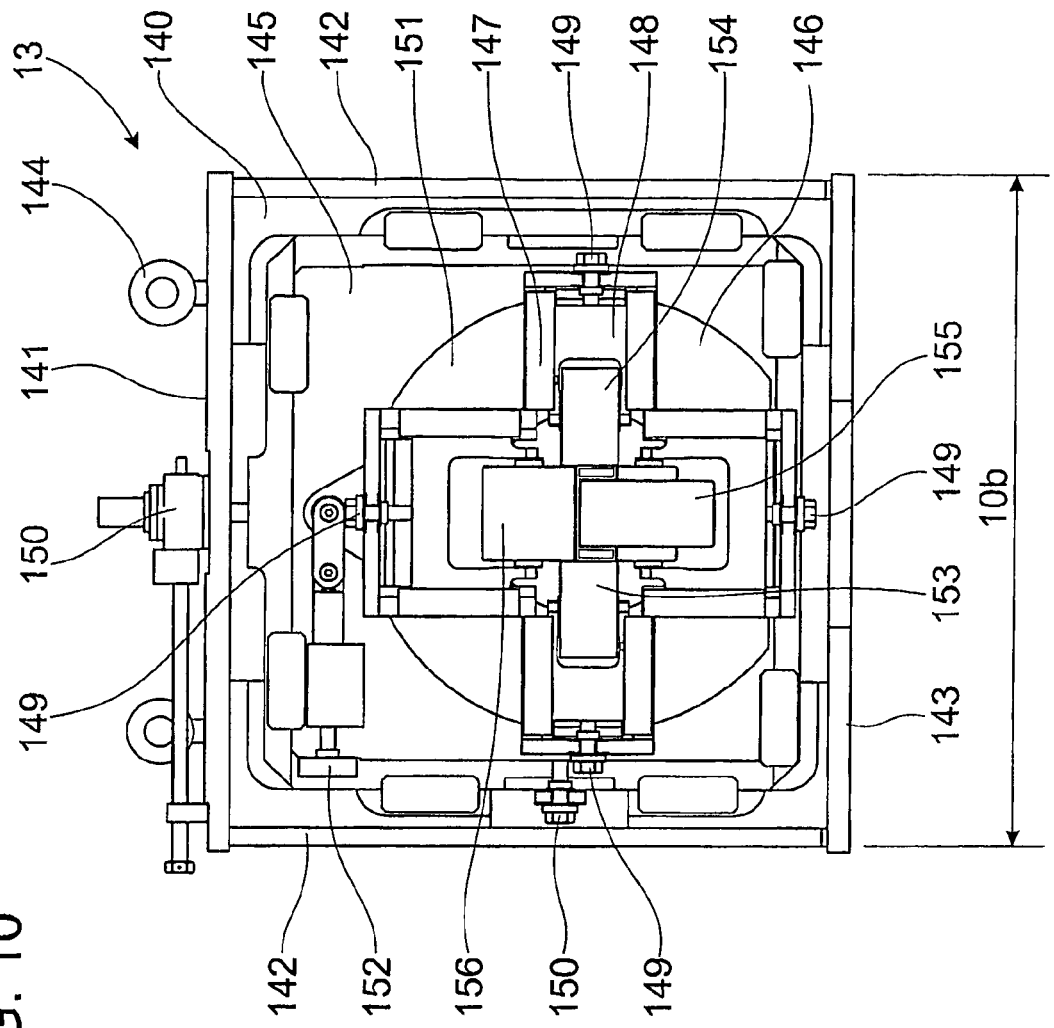
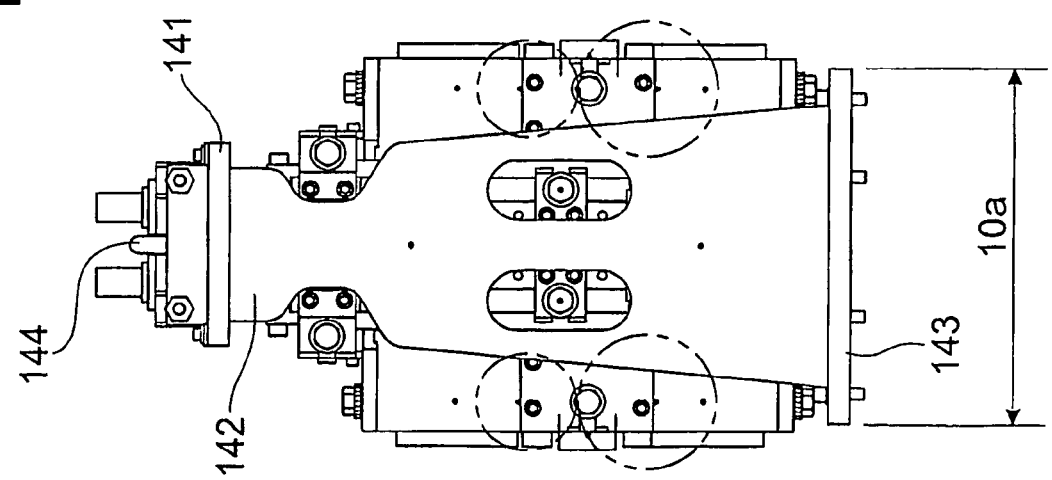
FIG. 10

COLD ROLL FORMING APPARATUS

FIELD OF THE INVENTION

This invention is concerned with improvements in cold roll forming mills.

The invention is concerned particularly, although not exclusively, with aspects of a cold roll forming mill for hollow flange members.

More particularly, the invention is concerned with aspects of a cold roll forming mill for the continuous production of dual welded hollow flange beams.

BACKGROUND OF THE INVENTION

It is known to produce hollow flange members by cold forming light gauge steel strip to form a section having a planar web and hollow triangular cross-section flanges extending along opposite sides of the web. U.S. Pat. Nos. 991,603 and 3,342,007 describe the manufacture of such beams by a cold forming process wherein the free edge of the hollow flange lies adjacent the edge of the web but is not secured thereto. These hollow flanges are known as "open" flanges and lack torsional resistance.

U.S. Pat. No. 3,698,224 describes the manufacture of hollow flange beams by a cold forming process wherein seam welded steel tubing is subjected to a shaping process which flattens the tube to form a hollow flange beam with a pair of juxtaposed webs.

In order to improve the section efficiency of "open" flange beams, it has been proposed to secure the edges of the hollow flanges to the web to improve torsional stiffness in the flanges. U.S. Pat. Nos. 6,436,552, 6,115,986, 6,397,550 and 5,692,353 describe cold formed thin gauge hollow flange beams wherein a lip formed along the edge of the hollow flange is secured to the web intermediate its edges by fasteners, clinch perforations, spot welding or the like.

Russian Inventor's Certificate 827723 describes a cold formed thin gauge hollow flange beam wherein the free edges of the hollow flanges are formed as internally folded lips or formations to support the hollow flanges against localized crushing under load. A side wall of the hollow flange is welded by a fillet weld to the edge of the web to form a "closed" flange.

In order to reduce the costs of manufacture of cold formed "closed" hollow flange beams, an in-line dual welding process was devised and described in U.S. Pat. No. 5,163,225, in respect of which, the assignee of the present invention is the successor in title. The dual welding process described for the first time an in-line high frequency induction or resistance welding process wherein a free edge of a hollow flange was welded to the face of the strip of metal to form a weld seam adjacent the edge of the web of the hollow flange beam so formed. In that process, a conventional tube rolling mill was adapted to produce hollow flange beams having circular cross-section flanges at the weld station, the circular cross-section flanges subsequently being shaped to triangular cross-section to form "Dogbone" (Registered Trade Mark) beams.

While generally satisfactory for a relatively narrow range of web and flange widths and a narrow range of metal strip gauges, an adaptation to a conventional mill structure was considered to be not only limiting in the scope of beam sizes but also inefficient and capital intensive in terms of requiring a large number of roll sets of large diameter which caused considerable unproductive downtime each time a roll change was required for a different beam size. Moreover, difficulties in maintaining weld seam stability imposed severe limitations on yield due to a high reject rate.

One proposal to address some of the shortcomings in the original "Dogbone" process was described in U.S. Pat. No. 5,403,986. This document proposed a tandem mill structure with separate spaced cold forming mills inclined to a longitudinal axis in a forming section of the mill. Shaped flanges, independently produced from separate strips of metal were brought together with a third planar web strip such that the edges of the web protruded between the free edges of the flanges prior to welding. The welding and forming stations were substantially the same as those described in U.S. Pat. No. 5,163,225.

As used herein, the expression "ERW" refers to electrical resistance or induction welding using either contacts or induction coils/impeders to create a current in the member and other forms of electrical resistance welding.

It is an aim of the present invention to overcome or alleviate at least some of the disadvantages of prior art methods and apparatus for the production of hollow flange seam welded beams.

SUMMARY OF THE INVENTION

According to one aspect of the invention there is provided a cold roll forming mill for the manufacture of hollow flange seam welded beams from a single strip of metal, said mill comprising:

a forming station;

a seam guide and welding station; and, a shaping station, said mill characterized in that either or both of said forming station and said shaping station comprises independently supported side engaging roll combinations adapted, in use, to roll opposite sides of said strip, adjacent transverse pairs of said side engaging roll combinations being selectively movable relative to each other in a transverse direction perpendicular to a direction of travel of said strip.

Suitably, some or all of said side engaging roll combinations are idler rolls.

If required, some or all of said side engaging roll combinations are drive rolls.

Preferably, drive rolls, spaced within said forming station and spaced within said shaping station engage a central region of said strip between formed edges thereof.

If required, some or all of said drive rolls may engage said strip over a substantial portion thereof between formed edges of said strip.

Alternatively, some or all of said drive rolls may engage said strip adjacent a central portion spaced from said formed edges.

In a still further alternative, some or all of said drive rolls may engage said strip adjacent opposed formed edges thereof.

The transverse pairs of side engaging roll combinations may be mounted on respective roll stand frames.

If required, transverse pairs of said side engaging roll combinations may be movably mounted on a common roll stand frame.

Suitably, said roll stand frames are selectively movable transversely of a mill bed.

The transverse pairs of side engaging roll combinations may be aligned in a transverse plane perpendicular to a direction of travel of a strip of metal between said side engaging roll combinations.

Preferably, each of said transverse pair of side engaging roll combinations is located in a respective longitudinally spaced transverse plane perpendicular to a direction of travel of a strip of metal between said side engaging roll combinations.

If required, at least one of a side engaging roll of a side engaging roll combination is rotatably mounted on an inclined axis lying in a transverse plane perpendicular to a direction of travel of a strip of metal through said side engaging roll combination.

At least one side engaging roll of a side engaging roll combination may be rotatably mounted on a horizontal axis lying in a transverse plane perpendicular to a direction of travel of a strip of metal through said side engaging roll combination.

Suitably, at least one side engaging roll of a side engaging roll combination is rotatably mounted on a vertical axis.

If required, said drive rolls may alternate with said side engaging roll combinations along a mill bed.

Suitably, any or all of said at least one of a side engaging roll of a side engaging roll combination is rotatable on an axis selectively angularly adjustable in a plane lying perpendicular to a direction of travel of a metal strip in said mill.

Preferably, said drive rolls are located between pairs of longitudinally spaced side engaging roll combinations along said mill bed.

Suitably, said seam guide and welding station includes a seam guide roll stand having at least one seam guide roll having a circumferential shoulder pivotally mounted on an inclined rotational axis lying in a transverse plane perpendicular to a direction of travel of said strip.

If required, said at least one seam guide roll may be selectively movable along said inclined axis.

The rotational axis of said seam guide roll may be selectively angularly adjustable in said transverse plane.

Preferably, the seam guide and welding station includes a weld box stand having at least one squeeze roll pivotally mounted on an inclined rotational axis lying in a transverse plane perpendicular to a direction of travel of said strip.

Suitably, said at least one squeeze roll may be selectively movable along said inclined axis.

If required, the rotational axis of said at least one squeeze roll may be selectively angularly adjustable in said transverse plane.

Preferably, one or more of said forming rolls and/or said shaping rolls may be rotatably journalled in a mounting frame releasably securable to a respective forming roll stand and/or a shaping roll stand.

If required, one or more sets of said forming rolls and/or said shaping rolls may be rotatably journalled in a mounting frame releasably securable to a respective forming roll stand and/or a shaping roll stand.

Suitably, said mounting frame is adjustable in a transverse plane perpendicular to a direction of travel of said strip through said mounting frame.

Preferably, said seam guide and welding station comprises:

a seam roll stand rotatably supporting at least one seam roll adapted, in use, to guide a free edge of a contoured edge region of said metal strip into linear alignment with a predetermined weld axis spaced from said free edge on a surface of said metal strip; and, a weld box stand rotatably supporting at least one pair of squeeze rolls, in use, to urge said free edge when heated to a predetermined temperature into fused engagement with a correspondingly heated said weld axis on said surface, said pair of squeeze rolls co-operating, in use, to guide said free edge through a predetermined linear trajectory substantially along an incidence axis of a subsequent weld junction between said free edge and said surface of said metal strip whereby energy imparted to said cold formed member is focussed by a proximity effect along said predetermined weld axis of said surface.

Suitably, said electrical current is induced in said free edge and said weld region by electrical contactors slidably engaging said metal strip adjacent said free edge and said weld region.

Preferably, said electrical current is induced in said free edge and said weld region by an induction coil transversely surrounding said metal strip in a plane perpendicular to a direction of travel of said metal strip therethrough.

Preferably, at least one of said pair of squeeze rolls is angularly adjustable in a plane perpendicular to a direction of travel of said metal strip therebetween.

At least one of said pair of squeeze rolls may be adjustable relative to the other of said pair in a direction perpendicular to a rotational axis of said at least one of said pair of squeeze rolls.

Suitably, said weld box includes web support rolls rotatable about parallel respective axes perpendicular to a direction of travel of a metal strip member therebetween.

If required, a web support roll may have a contoured outer edge to function as one of said pair of squeeze rolls.

The apparatus may include more than one seam roll stand.

If required, at least one of said seam roll stands includes a seam roll having a circumferential shoulder thereon, said circumferential shoulder, in use, providing an abutment for said free edge of said metal strip.

Suitably, a contoured guide roll is provided, in use, to urge said free edge of said metal strip into abutment with said circumferential shoulder.

If required, a rod-shaped impeder supported at one end thereof, upstream of said one or more seam roll stands, extends into a hollow interior of a contoured edge region of said metal strip.

According to another aspect of the invention there is provided a method of cold roll forming a hollow flange member from a single strip of metal, said method comprising the steps of:

driving a metal strip through a cold rolling mill by driven rolls engaging a planar central region of said strip;

forming a contour along at least one edge region of said strip by forming rolls;

continuously seam welding by an ERW process a free edge of said at least one edge region to a surface of said strip along a predetermined weld region to form a hollow flange; and, shaping said hollow flange by shaping rolls to form a shaped hollow flange of desired cross-sectional configuration.

If required, one or more of said forming rolls may be driven.

In addition, or alternatively, one or more of said shaping rolls may be driven.

Suitably, forming of said hollow flange is effected by one or more forming rolls rotatably supported about a pivotal axis inclined at an angle between vertical and horizontal in a transverse plane perpendicular to a direction of travel of said strip of metal.

If required, shaping may be effected by one or more shaping rolls rotatably supported about a pivotal axis inclined at an angle between vertical and horizontal in a transverse plane perpendicular to a direction of travel of said strip of metal.

Forming of said hollow flange may be effected by forming rolls mounted in longitudinally spaced transverse operating planes, said spaced operating planes being parallel to each other and perpendicular to a direction of travel of said strip of metal.

Suitably, shaping of said hollow flange may be effected by shaping rolls mounted in longitudinally spaced transverse operating planes, said spaced operating planes being parallel to each other and perpendicular to a direction of travel of said strip of metal.

Preferably prior to said step of continuous seam welding, said free edge is aligned linearly with a predetermined weld axis on said surface of said strip and said at least one free edge is guided through a predetermined linear trajectory along an incidence axis of a subsequent weld junction between said at least free one free edge and said surface whereby energy imparted to said hollow flange member is focussed by a proximity effect along said predetermined weld axis on said surface prior to fusing said at least one free edge thereto.

If required, said at least one free edge is aligned with said weld region by one or more seam rolls each having a circumferential shoulder providing an abutment for said at least one free edge.

Said at least one free edge of said metal strip may be urged into abutment with said circumferential shoulder by a contoured guide roll.

Suitably, said metal strip is supported centrally by opposed cylindrical roll surfaces adjacent said weld region as said at least one free edge is urged into abutment with said circumferential shoulder.

Said at least one free edge may be guided toward said closure region at a predetermined angle relative to strip surface by adjustably mounted seam rolls.

Preferably, said at least one free edge of said metal strip is guided through said predetermined trajectory by a contoured squeeze roll extending over said contoured surface of said metal strip between spaced substantially parallel contact faces of said contoured squeeze roll.

Weld energy may be imparted to said free edge and said predetermined weld region by an electrical induction coil or contactors, said coil extending substantially around said metal strip in a plane substantially perpendicular to a longitudinal axis thereof.

If required, an elongate rod-like induction impeder supported at one end may extend within a hollow interior cavity of said contoured surface to a region adjacent a closure region where said at least one free edge is fused to said surface of said metal strip.

BRIEF DESCRIPTION OF THE DRAWINGS

In order that the various aspects of the invention may be more fully understood and put into practical effect, reference will now be made to preferred embodiments illustrated in the accompanying drawings in which:

FIG. 10 shows schematically side and front elevations of a turk's head roll stand.

Figure 1:
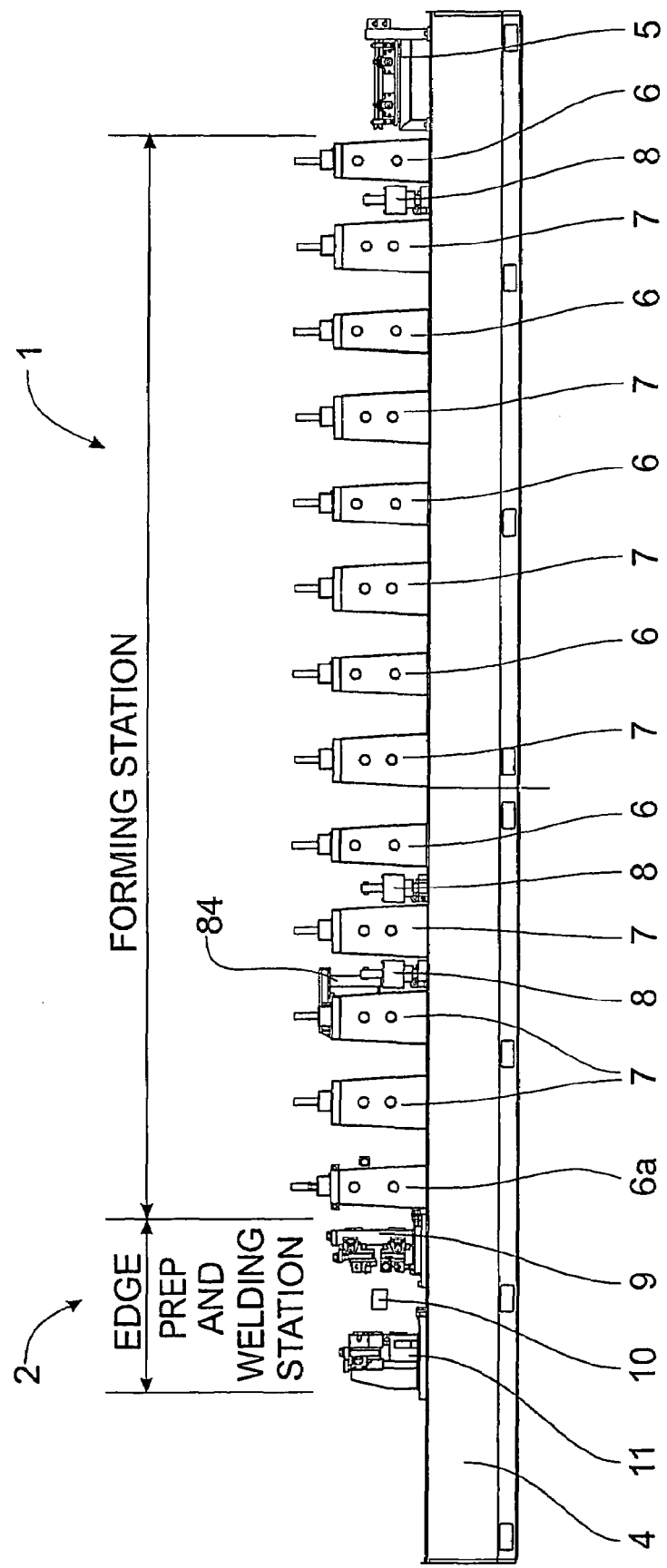
FIG. 1 is a schematic side elevational view of a forming station and edge preparation and welding station of a cold roll forming mill.

As used herein, the expression "front elevation" means a view in the direction of travel of a strip of metal therethrough.

Moreover, like numerals are employed for like features in the drawings for the sake of clarity.

DETAILED DESCRIPTION OF THE DRAWINGS

Figure 2:
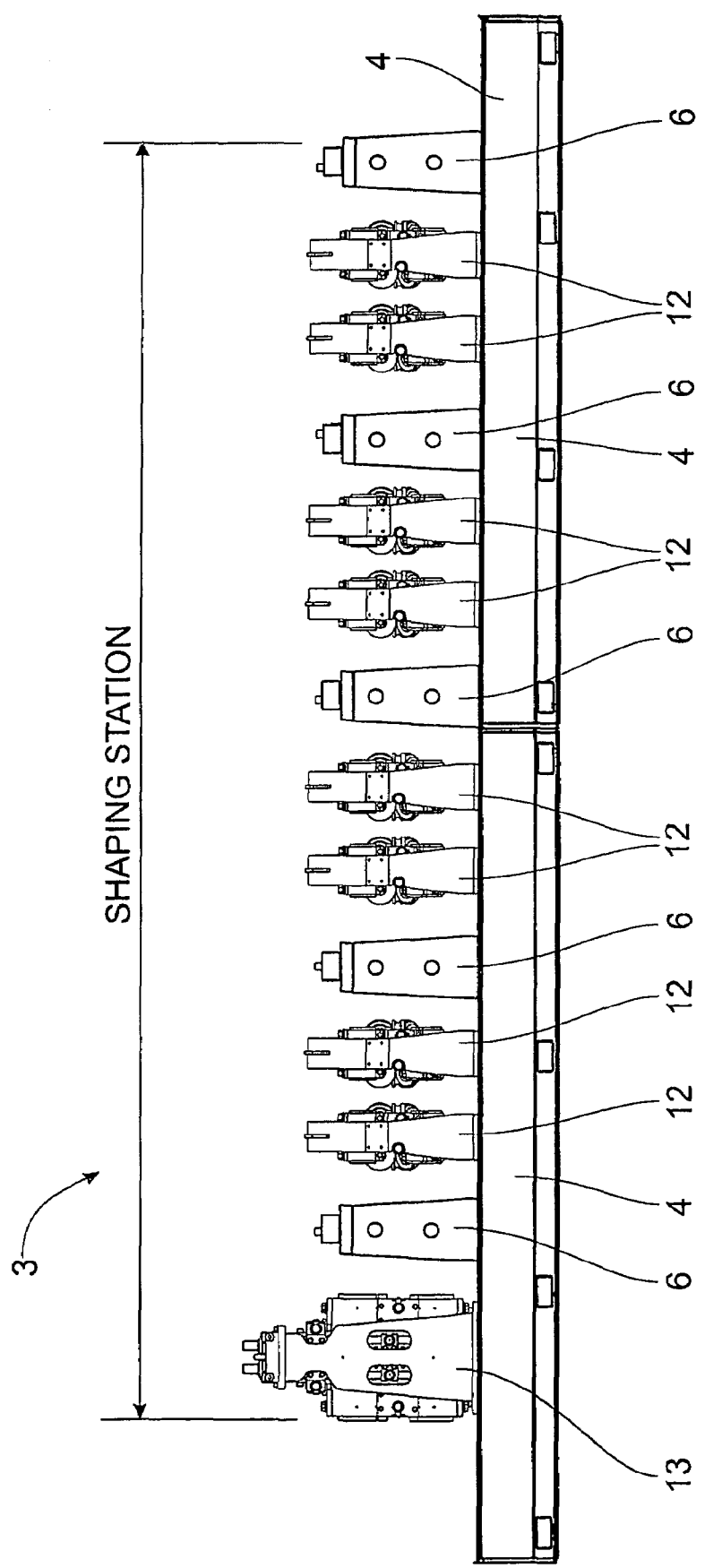
FIG. 2 is a schematic side elevational view of a shaping station of a cold roll forming mill.

In FIGS. 1 and 2, the cold forming mill comprises a forming station 1, an edge preparation and welding station 2 and a shaping station 3. Conventional slit strip roll handling and let off rolls upstream of the forming station 1 and flying saw and take-off table assemblies at the downstream end of shaping station 3 are omitted for the sake of clarity.

In FIG. 1, mill beds 4 support a conventional entry table 5, a series of drive roll stands 6, a series of forming roll stands 7, side roll assemblies 8, a seam guide roll stand 9, a weld coil 10 and a weld box 11.

FIG. 2 shows a downstream portion of the cold forming mill wherein mill beds 4 support drive roll stands 6, shaping roll stands 12 and a turk's head roll stand 13.

Figure 3:
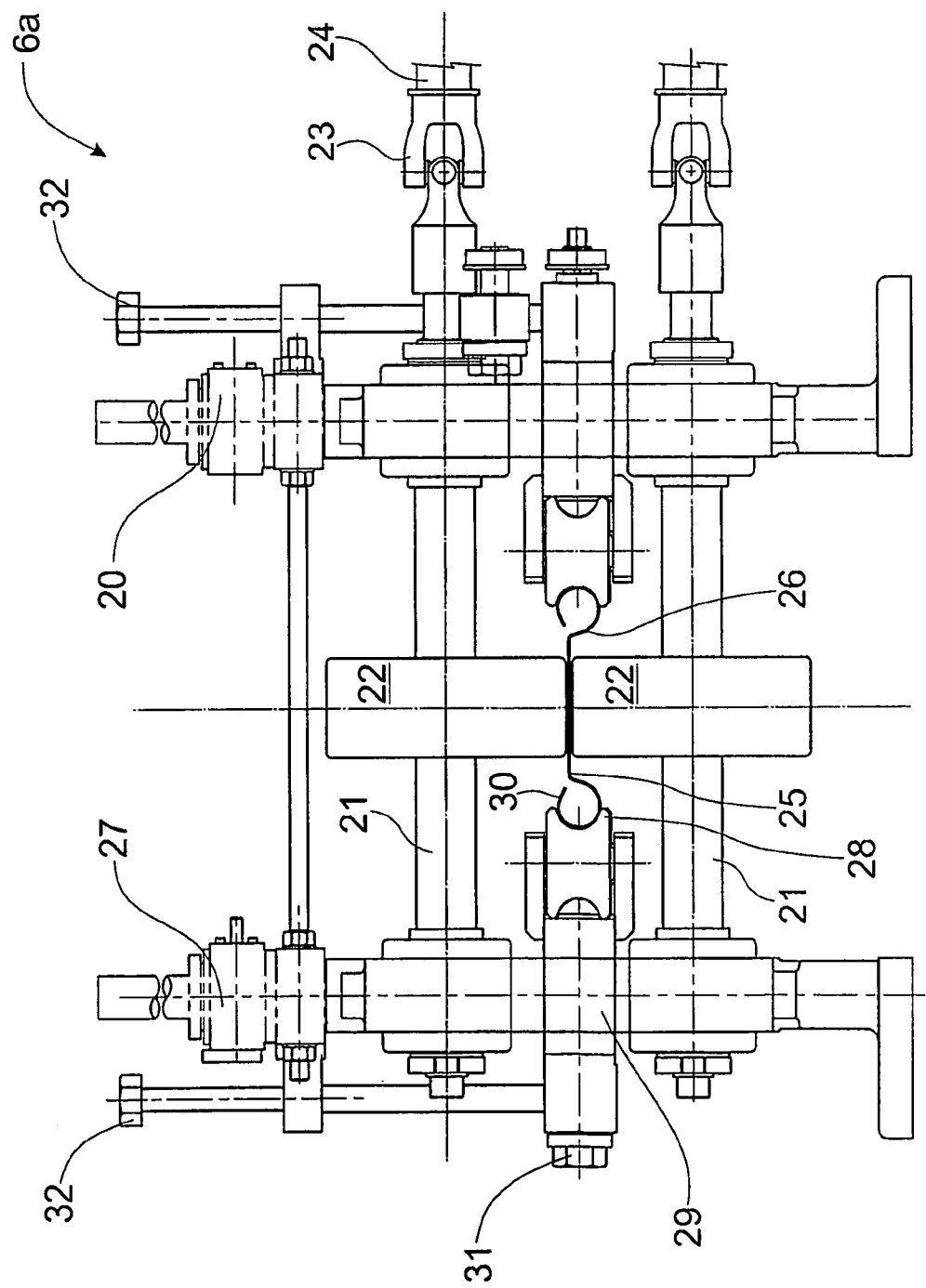
FIG. 3 shows schematically a front elevation of a driven roll stand fitted with side rolls.

FIG. 3 shows a front elevational view of drive roll stand 6a of FIG. 1. This roll stand differs from other roll stands 6 only in that it includes side-rolls to steady the formed strip prior to entry into the seam guide roll stand 9.

Drive roll stand 6a comprises a pair of spaced frames 20 in which are journalled roll shafts 21, each supporting a respective cylindrical drive roll 22. Roll shafts 21 are coupled via universal joints 23 to drive shafts 24 coupled to a conventional drive train (not shown). As can be seen, drive rolls 22 engage the central web 25 of a formed hollow flange beam member 26 and because the grip on the web is so good, it has been found unnecessary to drive any of the forming or shaping rolls in the mill. A conventional height adjustment mechanism 27 provides vertical height adjustment to upper roll shaft 21 to adjust the nip between upper and lower rolls 22 to accommodate differing metal strip feedstock thickness. If required, selected drive rolls may be contoured to assist in forming or shaping hollow flanges.

Mounted on an upstream side of roll stand 6a is a side roll assembly comprising a pair of side rolls 28 supported on respective mounting brackets 29. Side rolls 28 engage the hollow flanges 30 of member 26 for precise lateral location prior to entry into the seam guide roll stand 9 and are adapted for lateral adjustment by screw adjuster 31 and for vertical adjustment by screw adjusters 32.

Figure 4:
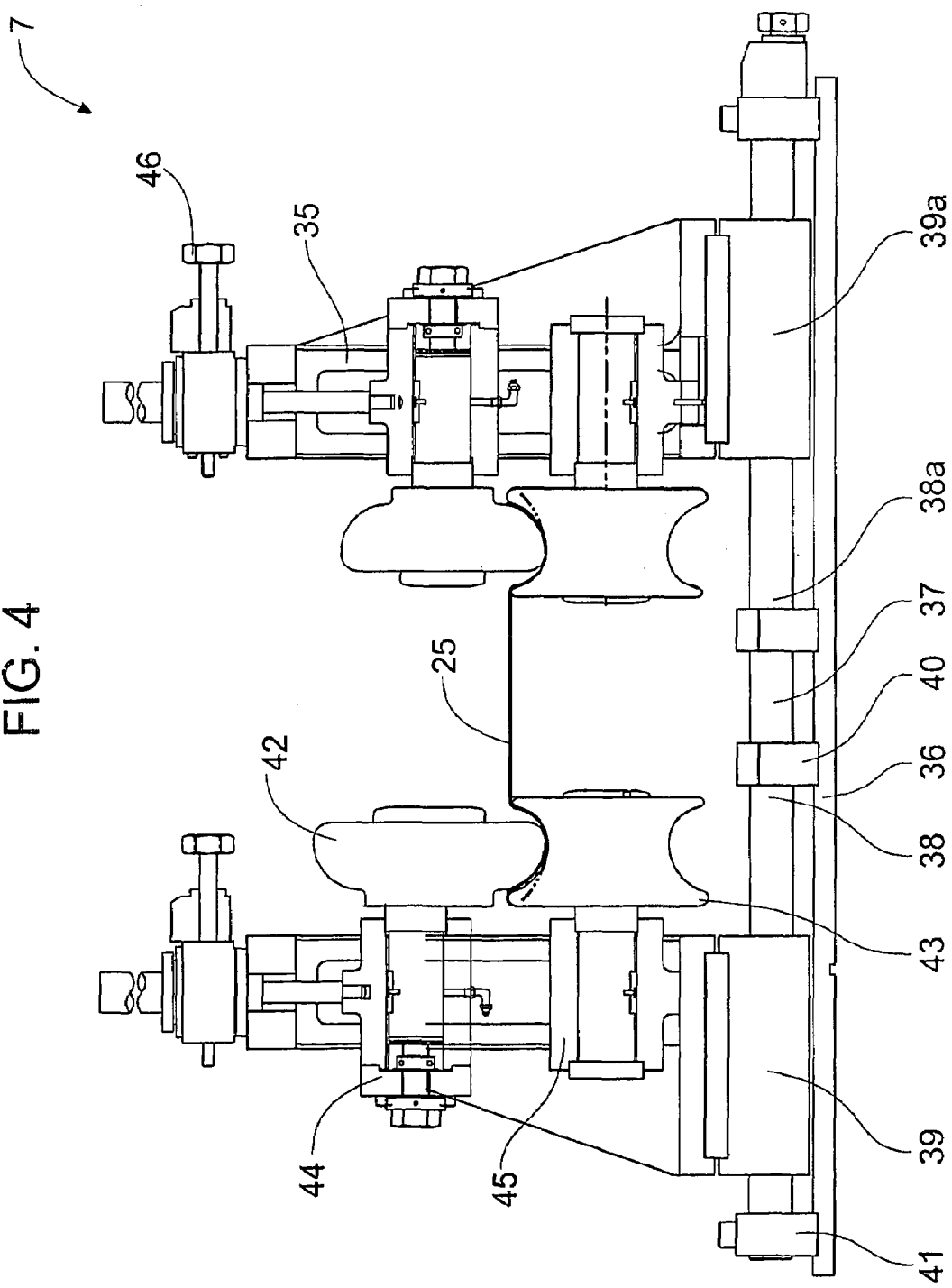
FIG. 4 shows schematically a rear elevation of a forming roll stand.

FIG. 4 illustrates a rear elevational view of a typical undriven forming roll stand 7 showing a pair of frames 35 adjustably mounted on a base 36 for selective relative lateral movement by a shaft 37 having threaded portions 38,38a of opposite hand engaging in respective slide blocks 39,39a. Frames 35 are slidably adjustable between inner and outer stops 40,41 respectively.

Upper and lower forming rolls 42,43 are supported on respective mounting brackets 44,45 and upper mounting brackets 44 are slidably mounted on frames for vertical adjustment by adjusting screws 46 to accommodate differing thicknesses of the metal strip feedstock or differing roll set configurations.

Figure 5:
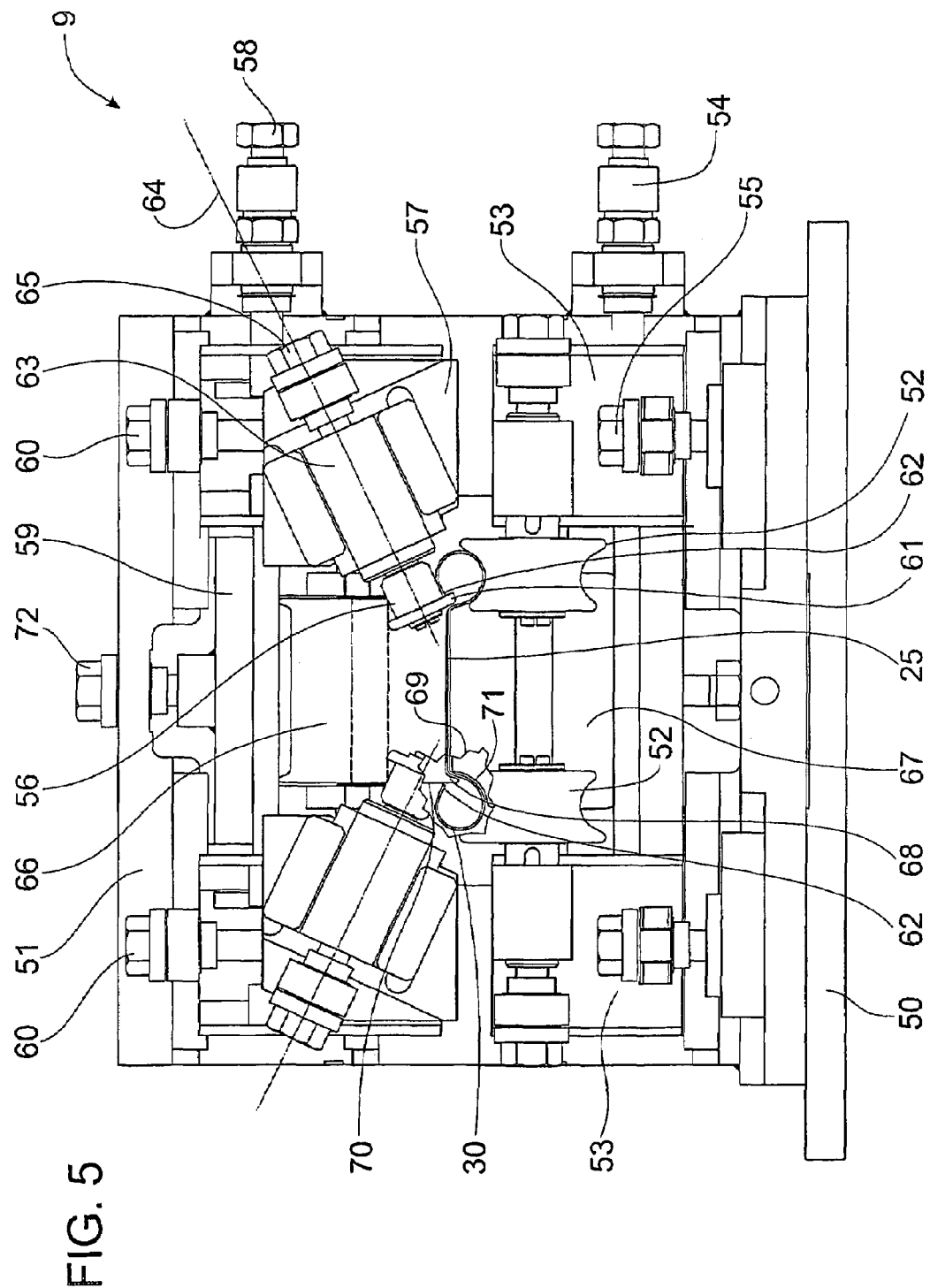
FIG. 5 shows schematically a rear elevation of a seam guide roll stand.

FIG. 5 shows a rear elevational view of a seam guide roll stand 9 having a base 50 and a support frame 51. On the downstream side of the frame as viewed are a pair of contoured support rolls 52 which support the hollow flange regions 30 on either side of web 25. Rolls 52 are rotatably journalled in lower roll support brackets 53 slidably mounted on frame 51 and movable laterally relative to each other by an oppositely handed threaded screw adjustment 54. Vertical adjustment of lower roll support brackets 53 is achieved by screw-threaded adjusters 55. Seam guide rolls 56 are mounted on upper roll support brackets 57 which are mounted for lateral relative movement on frame 51 by adjuster 58 having a shaft 59 with oppositely handed screw-threads and also for vertical movement by adjuster screws 60.

Seam guide rolls 56 have a circumferential shoulder 61 which provides an abutment against with the free edge 62 of hollow flange 30 is urged. Seam guide rolls rotatably journalled in slide blocks 63 which are linearly adjustable along respective rotational axes 64 by adjuster screws 65 and, if required slide blocks 63 may be pivotally mounted on upper roll support brackets for angular adjustment in a transverse plane perpendicular to a direction of travel of the metal strip feedstock therethrough.

Mounted on a front side of frame 51 is a pair of web support rolls 66,67, upper support roll 66 having a circumferential rim 68 engaging between the free edge 62 of the flange 30 and the side of web 25 as shown in the cutaway region 69. The end wall 70 of support roll 66 also serves as an abutment for free edge 62 of flange 30. Also shown in cutaway region 69 is a contoured end wall 71 of lower support roll 67 which also supports the hollow flange 30. Relative vertical movement between web support rolls 66 and 67 is achieved by adjuster screw 72.

Figure 6:
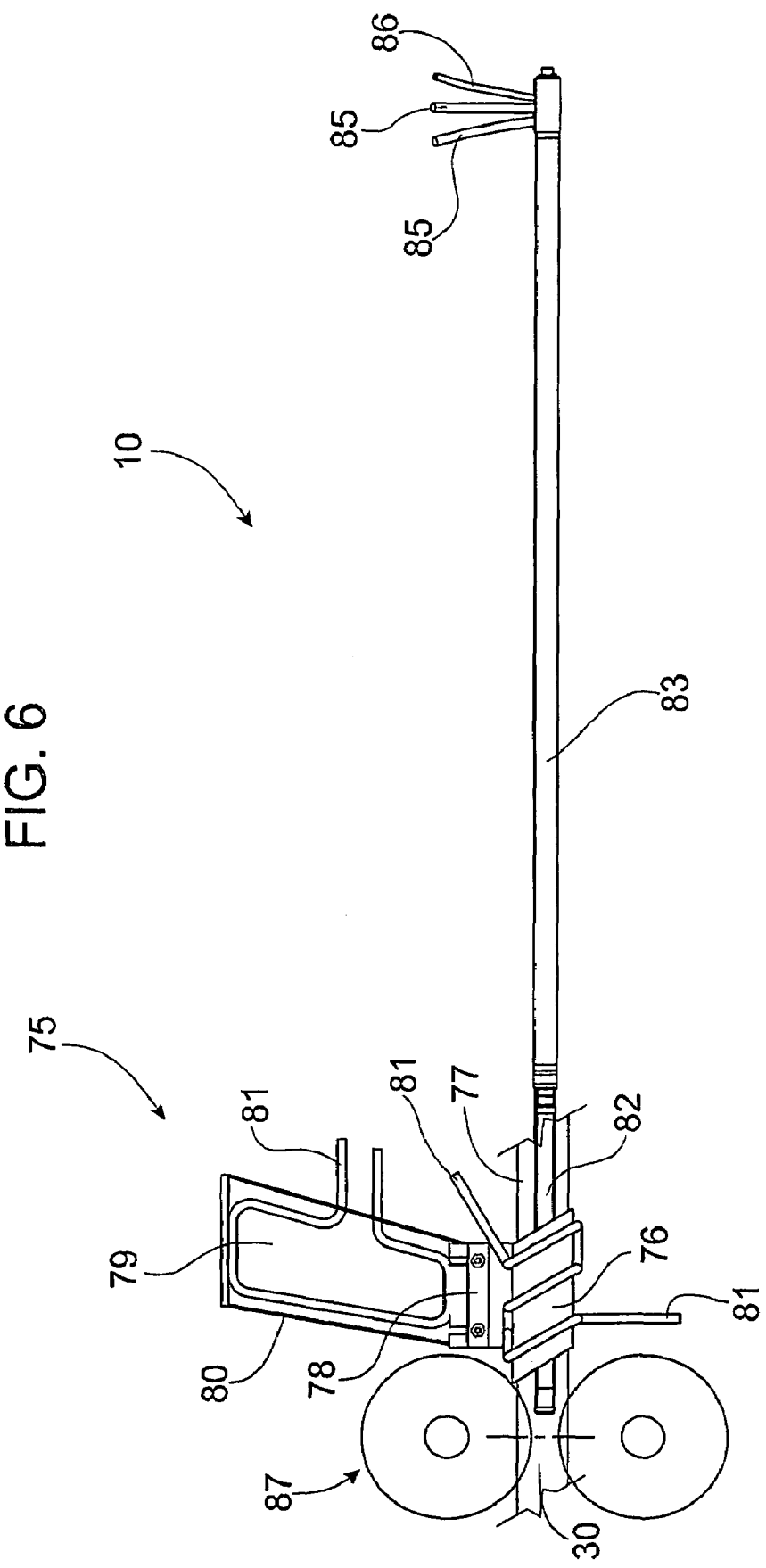
FIG. 6 shows schematically a side elevation of a welding apparatus.

FIG. 6 shows a high frequency electrical induction welding apparatus 10 shown schematically in FIG. 1 between seam guide roll stand 9 and weld box 11.

Welding apparatus 10 comprises an induction coil assembly 75 in the form of a sheet copper loop 76 which surrounds a hollow flange member 77 as it passes therethrough. Loop 76 is supported at its free ends 78 by respective sheet copper support brackets 79 separated by an electrical insulating medium 80. Coil assembly 75 is cooled by water recirculating in copper tubes 81 secured to assembly 75.

Located within each hollow flange 30 in the region of coil 76 is an impedance device 82 comprising a fibreglass tube filled with ferrite rods (not shown). Each impeder 82 is supported by an elongate rod 83 supported by a bracket 84 (shown in FIG. 1) which extends into the hollow interior of a respective web via the gap between the free edge of the hollow flange and the side of the web as seen in FIG. 5. Cooling water is recirculated through the impeder 82 via tubes 85 and a source of compressed air is pumped through the impeder 82 via tube 86. After the free edges of the hollow flanges and the weld seam lines along the respective sides of the web are heated to fusion temperature by the welding apparatus 10, the heated free edges of the flanges are urged into contact with respective heated weld seam lines by squeeze roll sets, shown schematically at 87, in the weld box 11 of FIG. 1.

Figure 7:
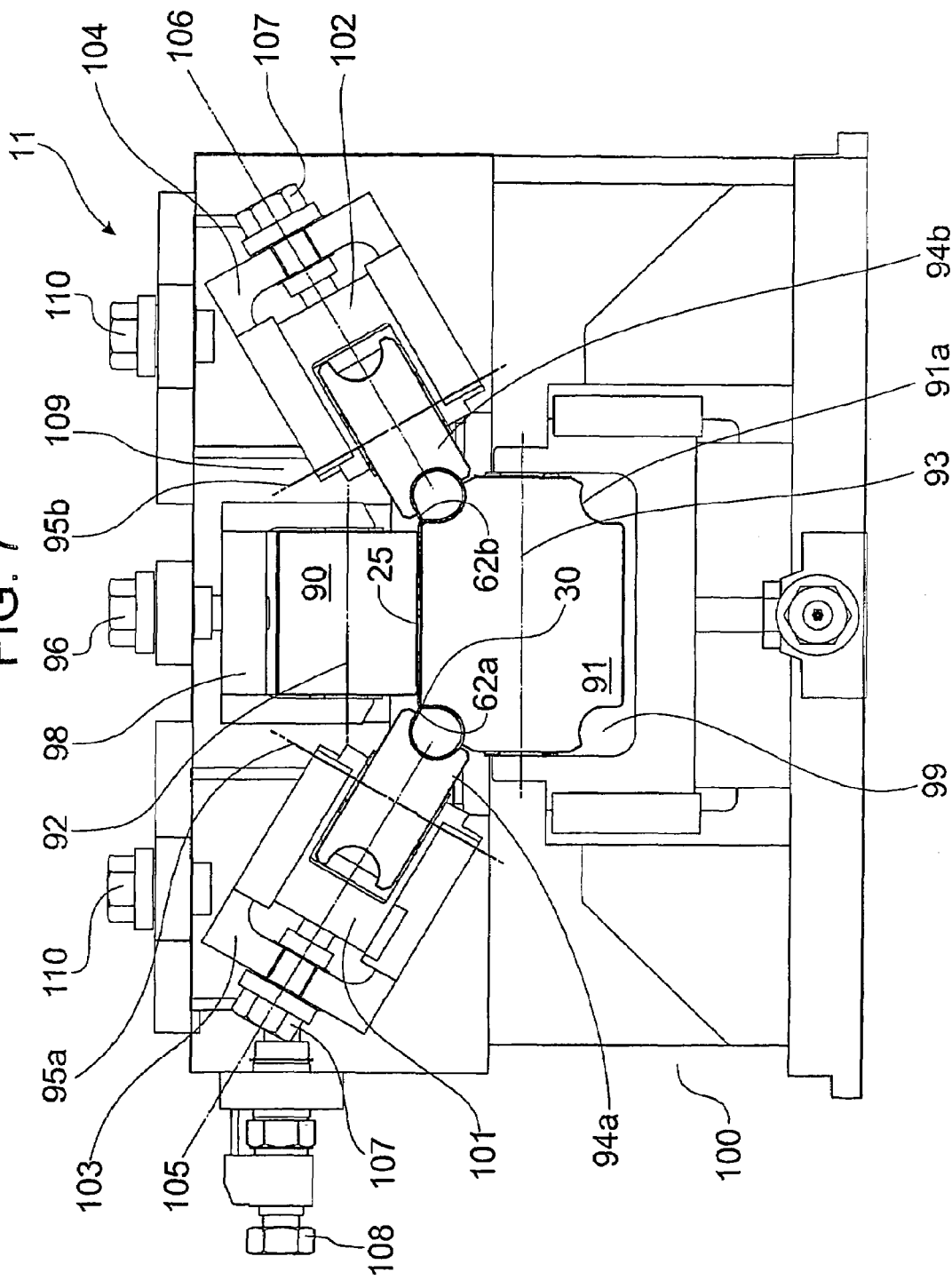
FIG. 7 shows schematically a front elevation of a weld box stand.

FIG. 7 shows the configuration of the four roll weld box 11 in FIG. 1.

Weld box 11 comprises a cylindrical top roll 90 and a cylindrical lower roll 91 with contoured edges 91a, each of rolls 90,91 being rotatably journalled about respective rotational axes 92,93. Contoured squeeze rolls 94a,94b rotatable about respective inclined axes 95a,95b are adapted to urge the heated free edges 62a,62b of hollow flanges 30 into respective heated weld seam line regions along the opposed boundaries of web 25 to effect fusion therebetween to create a continuous weld seam. It will be noted that the cavities defined between squeeze rolls 94a,94b and respective contoured edges 91a of cylindrical support roll 91 are ovoid in shape.

The free edges 62a,62b are urged toward respective weld lines in a linear fashion perpendicular to the respective rotational axes 95a,95b of squeeze rolls 94a,94b without a transverse "sweeping" action thereby maintaining stable induction "shadows" or pathways on or at the desired position of the weld seams between respective free edges 64a,64b and the opposed boundaries of web 25.

Cylindrical roller 90 is adjustably mounted for movement in an upright plane by adjustment screw 96, the screw 96 being coupled to roll carriage 98, slidably mounted in support frame 100.

Squeeze rolls 94a,94b are slidably mounted in respective carriages 101,102 of squeeze roll support frames 103,104 respectively for slidable adjustment along respective sliding axes 105,106 means of adjustment screws 107. Squeeze roll support frames 103,104 are, in turn, adjustably mounted for transverse movement by a screw 108 coupling mountings for support frames 103,104 by a threaded shaft 109 and for upright movement by screws 110. Preferably, roll support frames are pivotally mounted on frame 100 for pivotal movement about respective axes parallel to the direction of movement of a hollow flanged member moving through weld box stand 11.

The adjustable roll mounting enables a wide range of hollow flange members of varying dimensions and cross-sectional configurations to be welded in the weld box with extremely precise control over the trajectory through which the free edges of the hollow flanges travel towards a precisely located weld seam line adjacent or at the edges of the member web.

Figure 8:
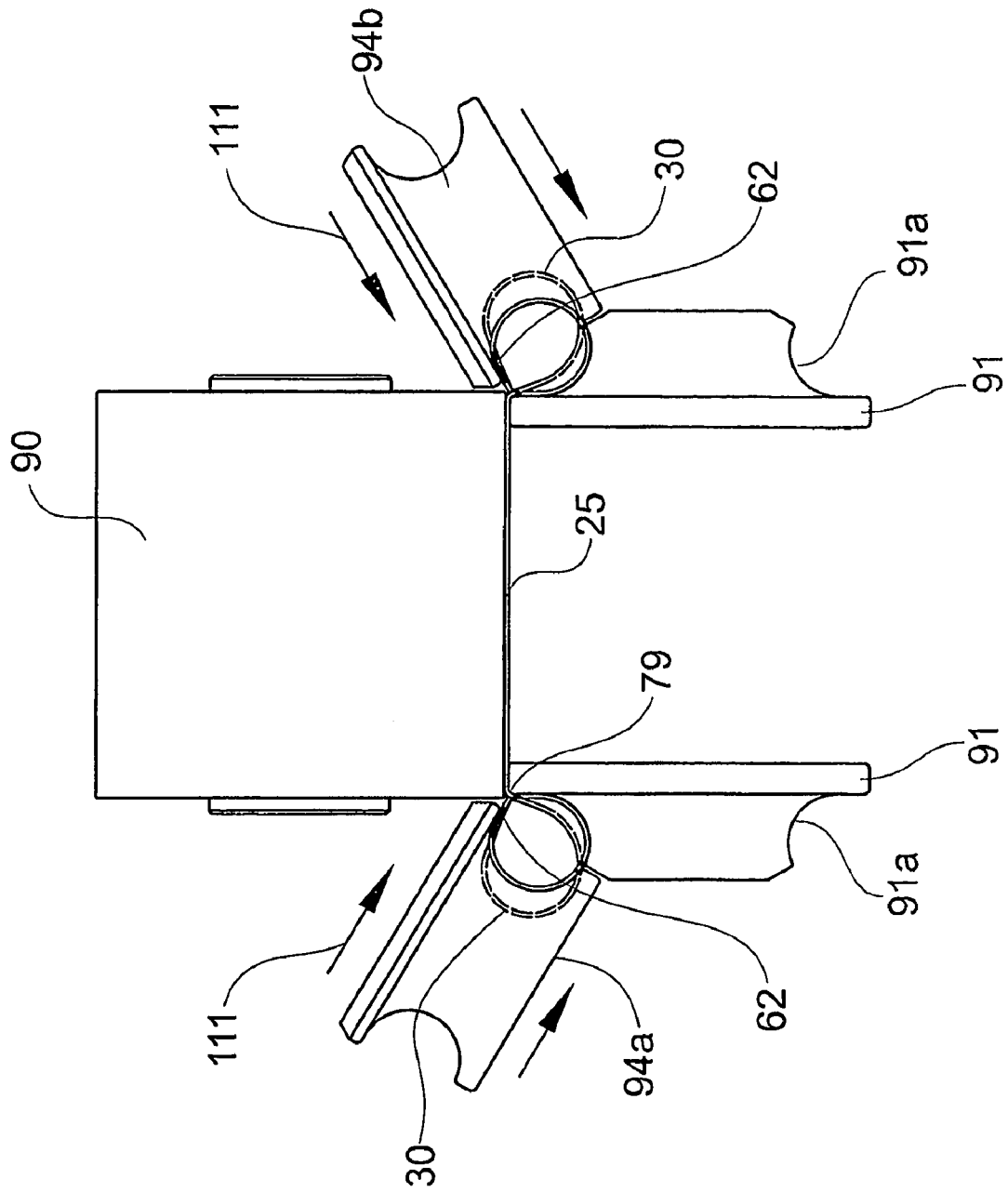
FIG. 8 shows schematically the operation of the squeeze rolls in the weld box stand.

FIG. 8 shows schematically the configuration of the rolls in weld box 11 of FIG. 7 to more clearly illustrate the guidance of the free edges of the hollow flanges into the weld seams along the edges of the web.

In the drawing a somewhat exaggerated position of the formed hollow flanges 30 and their respective free edges 62 is shown in phantom. As the formed section approaches the roll combination, hollow flanges 30 are urged inwardly towards the contoured ends 91a of separate rollers 91 which correspond to the movement of rollers 94a,94b along respective sliding axes 105,106 as shown in FIG. 7.

Importantly, it can be seen that about half of the outer portion of the hollow flanges which terminate in the free edges 62 is urged in the direction shown by arrows 111 whereby the almost flat region of the flange adjacent the free edge 62 and a corresponding portion of the opposite side of the flange are driven together as a unitary portion towards roll 91 whereby deformation of the remaining portion of the flange adjacent the boundary 79 of the web 25 is accommodated in the contoured edges 91a of rolls 91. Equally, it will be seen that the free edge 62 of the flange 30 travels in a straight line trajectory to the boundary 79 of web 25 where the weld seam is formed.

Figure 9:
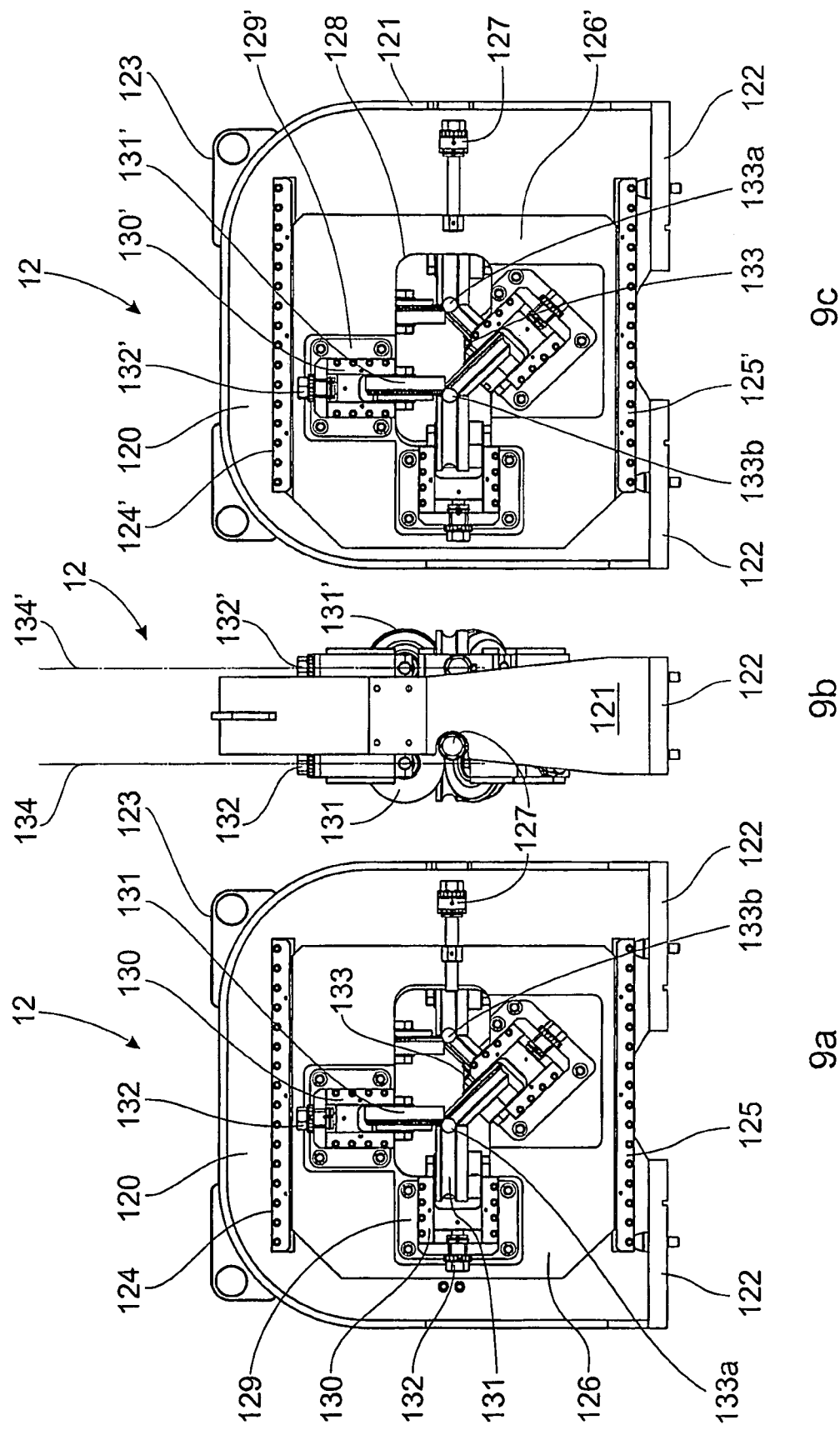
FIG. 9 shows schematically front, side and rear elevations of a shaping roll stand.

FIG. 9 shows a shaping roll stand 12 of FIG. 2 wherein FIG. 9a is a rear elevational view, FIG. 9b is a side elevation and FIG. 9c is a front elevational view.

Roll stand 12 comprises an arched plate-like frame 120 reinforced by a web 121 attached about an outer edge thereof. Frame 120 is supported on base pads 122 and includes lifting eyes 123 for ease of handling. Track members 124,125 slidably locate a shaping roll carriage 126 which is transversely adjustable by adjuster screw 127. Mounted about a central aperture 128 in frame 120 are shaping roll support frames 129, each slidably locating a roll mounting bracket 130 in which is rotatably journalled a shaping roll 131. Roll mounting brackets 130 are slidably adjustable in respective support frames 129 by adjuster screws 132 which move the shaping rolls 131 in a transverse plane perpendicular to the direction of travel of a hollow flange 133a of a beam 133 moving therethrough. Shaping rolls 131 are mounted with respective rotational axes in a common transverse mounting plane represented at 134 in FIG. 9b and respective adjuster screws 127 move the shaping rolls 131 in their common mounting plane in a direction perpendicular to respective rotational axes.

Just visible via aperture 128 is a set of three shaping rolls 131a engaged about an opposite hollow flange 133b of beam 133 on the other side of frame 120.

As can be seen from FIGS. 9b and 9c a front elevational view of the shaping roll stand is substantially identical except that roll carriage 126 is displaced to the left to accommodate hollow flange 133b spaced from hollow flange 133a by the width of the web therebetween.

Although like reference numerals have been employed for like features, the reference numerals for the features on the front face are distinguished by a prime.

The particular advantages conferred by this configuration of roll stand, whether for shaping rolls or forming rolls is its adaptability to a wide range of sizes of hollow flanged beams with a wide range of cross-sectional shapes possible in the hollow flanges. Moreover, location of the roll sets for opposite flanges in longitudinally spaced planes permits the ruse of multiple roll combinations such as that illustrated without the interference with an adjacent set of rolls in the same plane for shaping or forming of an opposite hollow flange. By using a three roll set of forming rolls as shown hollow flange beams with closely spaced or otherwise relatively deep flanges can now be rolled without the limitations otherwise imposed in conventional mills.

A still further advantage of a roll stand as illustrated in FIG. 9 with a three roll shaping set is that by operating one of the rolls with an inclined rotational axis as shown, a tapered edge roll of a relatively small diameter can still provide a deep support face for an upright flange edge without "scrubbing" the face of the flange as a result of the forming velocity differential across a planar side wall of a cylindrical roll.

The roll stand shown in FIG. 9 is considered to permit substantial cost savings in the cost of roll sets as diameters of 25-30% less than conventional roll diameters may be employed. Moreover, the adjustability of the rolls allows a large range of beam sizes to be rolled without having to effect roll changes simply to accommodate changes in web width. Where roll changes are required either for a change in hollow flange beam size or configuration or merely for maintenance purposes, a complete roll carriage changeover may be effected in minutes and similarly, replacement of a mounting roll bracket also can be effected rapidly.

FIG. 10 shows a double sided turk's head roll stand 13 having a configuration similar to shaping roll stands 12 shown in FIG. 9.

Referring in particular to FIG. 10b, turk's head roll stand 13 comprises a plate-like frame 140 with top and side reinforcing webs 141,142 respectively. A mounting base 143 is adapted for mounting on a mill bed as shown in FIG. 2 and lifting eyes 144 are provided for handling purposes. Mounted on opposite faces of frame 140 are roll mounting plates 145 with aligned central apertures 146. Mounted about apertures 146 are roll mounting frames 147 slidably locating roll mounting brackets 148 which are axially adjustable by respective adjuster screws 149. Roll mounting plates 145 are axially adjustable by adjusting screws 150.

Roll mounting frames 147 are mounted on a face plate 151 in turn rotatably mounted on roll mounting plates 145 and at least partial rotation of face plate 151 relative thereto is effected by adjusting screw 152. Relative rotational adjustment between the face plates 151 on the front and rear sides of the turk's head frame 140 permits any twisting or axial deformations in the hollow flange beam to be removed by idler rolls 153, 154, 155 and 156 before the beam progresses to a flying saw or the like to be severed into predetermined lengths.

It readily will be apparent to persons skilled in the art that many modifications and variations may be made to the various aspects of the invention without departing from the spirit and scope thereof.

The invention claimed is:

1. A cold roll forming mill for the manufacture of hollow flange seam welded beams from a single strip of metal, said mill comprising:
    a forming station;
    a seam guide and welding station; and,
    a shaping station;
    wherein either or both of said forming station and said shaping station comprises independently supported side engaging roll combinations adapted, in use, to roll either or both of opposite sides of said strip, adjacent transverse pairs of said side engaging roll combinations being selectively movable relative to each other in a transverse direction perpendicular to a direction of travel of said strip through said mill, and all forming and shaping rolls of either or both of said forming station and said shaping station consist of said side engaging roll combinations; and
    wherein each of said transverse pair of side engaging roll combinations is located in a respective longitudinally spaced transverse plane perpendicular to a direction of travel of said strip of metal between said side engaging roll combinations.

2. A mill as claimed in claim 1 wherein some or all of said side engaging roll combinations are idler rolls.

3. A mill as claimed in claim 1 wherein some or all of said side engaging roll combinations are drive rolls.

4. A mill as claimed in claim 1 wherein drive rolls, spaced within said forming station and spaced within said shaping station engage a central region of said strip between formed edge regions thereof.

5. A mill as claimed in claim 4 wherein some or all of said drive rolls engage said strip over a substantial portion thereof between formed edge regions of said strip.

6. A mill as claimed in claim 4 wherein some or all of said drive rolls engage said strip adjacent a central portion spaced from said formed edges.

7. A mill as claimed in claim 4 wherein some or all of said drive rolls engage said strip adjacent opposed formed edges thereof.

8. A mill as claimed in claim 1 wherein transverse pairs of side engaging roll combinations are mounted on respective roll stand frames.

9. A mill as claimed in claim 1 wherein transverse pairs of said side engaging roll combinations are movably mounted on a common roll stand frame.

10. A mill as claimed in claim 8 wherein said roll stand frames are selectively movable transversely of a mill bed.

11. A mill as claimed in claim 1 wherein at least one side engaging roll of a side engaging roll combination is rotatably mounted on an inclined axis lying in a transverse plane perpendicular to a direction of travel of a strip of metal through said side engaging roll combination.

12. A mill as claimed in claim 1 wherein at least one side engaging roll of a side engaging roll combination is rotatably mounted on a horizontal axis lying in a transverse plane perpendicular to a direction of travel of a strip of metal through said side engaging roll combination.

13. A mill as claimed in claim 1 wherein at least one side engaging roll of a side engaging roll combination is rotatably mounted on a vertical axis.

14. A mill as claimed in claim 4 wherein said drive rolls alternate with said side engaging roll combinations along a mill bed.

15. A mill as claimed in claim 1 wherein any or all of said at least one side engaging roll of a side engaging roll combination is rotatable on an axis selectively angularly adjustable in a plane lying perpendicular to a direction of travel of a metal strip in said mill.

16. A mill as claimed in claim 4 wherein said drive rolls are located between pairs of longitudinally spaced side engaging roll combinations along said mill bed.

17. A mill as claimed in claim 1 wherein said seam guide and welding station includes a seam guide roll stand having at least one seam guide roll having a circumferential shoulder pivotally mounted on an inclined rotational axis lying in a transverse plane perpendicular to a direction of travel of said strip, said shoulder, in use, providing abutment for said free edge of said metal strip.

18. A mill as claimed in claim 17 wherein said at least one seam guide roll is selectively movable along said inclined axis.

19. A mill as claimed in claim 17 wherein a rotational axis of said seam guide roll is selectively angularly adjustable in said transverse plane.

20. A mill as claimed in claim 1 wherein said seam guide and welding station includes a weld box stand having at least one squeeze roll pivotally mounted on an inclined rotational axis lying in a transverse plane perpendicular to a direction of travel of said strip.

21. A mill as claimed in claim 20 wherein said at least one squeeze roll is selectively movable along said inclined axis.

22. A mill as claimed in claim 20 wherein a rotational axis of said at least one squeeze roll is selectively angularly adjustable in said transverse plane.

23. A mill as claimed in claim 1 wherein side engaging roll combinations are rotatably journalled on a respective mounting frame releasably securable to a respective forming roll stand and/or a shaping roll stand.

24. A mill as claimed in claim 23 wherein said mounting frame is adjustable in a transverse plane perpendicular to direction of travel of said strip through said mounting frame.

25. A mill as claimed in claim 1 wherein said seam guide and welding station comprises:
a seam roll stand rotatably supporting at least one seam roll adapted, in use, to guide a free edge of a contoured edge region of said metal strip into linear alignment with a predetermined weld axis spaced from said free edge on a surface of said metal strip; and,
a weld box stand rotatably supporting at least one pair of squeeze rolls, in use, to urge said free edge when heated to a predetermined temperature into fused engagement with a correspondingly heated said weld axis on said surface, said pair of squeeze rolls co-operating, in use, to guide said free edge through a predetermined linear trajectory substantially along an incidence axis of a subsequent weld junction between said free edge and said surface of said metal strip whereby energy imparted to said cold formed member is focussed by a proximity effect along said predetermined weld axis of said surface.

26. A mill as claimed in claim 25 wherein electrical current is induced in said free edge and said weld region by electrical contactors slidably engaging said metal strip adjacent said free edge and said weld region.

27. A mill as claimed in claim 25 wherein said electrical current is induced in said free edge and said weld region by an induction coil transversely surrounding said metal strip in a plane perpendicular to a direction of travel of said metal strip therethrough.

28. A mill as claimed in claim 25 wherein at least one of said pair of squeeze rolls is angularly adjustable in a plane perpendicular to a direction of travel of said metal strip therebetween.

29. A mill as claimed in claim 25 wherein at least one of said pair of squeeze rolls is adjustable relative to the other of said pair in a direction perpendicular to a rotational axis of said at least one of said pair of squeeze rolls.

30. A mill as claimed in claim 25 wherein said weld box stand includes web support rolls rotatable about parallel respective axes perpendicular to a direction of travel of a metal strip member therebetween.

31. A mill as claimed in claim 25 wherein a web support roll has a contoured outer edge to function as one of said pair of squeeze rolls.

32. A mill as claimed in claim 25 including more than one seam roll stand.

33. A mill as claimed in claim 25 wherein a contoured guide roll is provided, in use, to urge said free edge of said metal strip into abutment with said circumferential shoulder.

34. A mill as claimed in claim 25 wherein a rod-shaped impeder supported at one end thereof, upstream of said one or more seam roll stands, extends into a hollow interior of a contoured edge region of said metal strip.

35. A method of cold roll forming a hollow flange member from a single strip of metal, said method comprising:
driving a metal strip through a cold rolling mill by driven rolls engaging a planar central region of said strip;
forming a contour along at least one edge region of said strip by forming rolls;
continuously seam welding by an ERW process a free edge of said at least one edge region to a surface of said strip along a predetermined weld region to form a hollow flange; and,
shaping said hollow flange by shaping rolls to form a shaped hollow flange of desired cross-sectional configuration;
wherein said forming rolls and said shaping rolls consist of side engaging roll combinations being selectively movable relative to each other in a transverse direction perpendicular to a direction of travel of said strip through said mill; and
wherein shaping of said hollow flange is effected by shaping rolls mounted in longitudinally spaced transverse operating planes, said spaced operating planes being parallel to each other and perpendicular to a direction of travel of said strip of metal in said mill.

36. A method as claimed in claim 35 wherein one or more of said forming rolls are driven to assist in driving said strip through said mill.

37. A method as claimed in claim 35 wherein one or more of said shaping rolls are driven.

38. A method as claimed in claim 35 wherein prior to continuous seam welding, said free edge is aligned linearly with a predetermined weld axis on said surface of said strip and said at least one free edge is guided through a predetermined linear trajectory along an incidence axis of a subsequent weld junction between said at least free one free edge and said surface wherein energy imparted to said hollow flange member is focussed by a proximity effect along said predetermined weld axis on said surface prior to fusing said at least one free edge thereto.

39. A method as claimed in claim 35 wherein said at least one free edge is aligned with said weld region by one or more seam rolls each having a circumferential shoulder providing an abutment for said at least one free edge.

40. A method as claimed in claim 39 wherein at least one free edge of said metal strip is urged into abutment with said circumferential shoulder by a contoured guide roll.

41. A method as claimed in claim 39 wherein said metal strip is supported centrally by opposed cylindrical roll surfaces adjacent said weld region as said at least one free edge is urged into abutment with said circumferential shoulder.

42. A method as claimed in claim 39 wherein at least one free edge is guided toward said closure region at a predetermined angle relative to strip surface by adjustably mounted seam rolls.

43. A method as claimed in claim 35 wherein said at least one free edge of said metal strip is guided through said predetermined trajectory by a contoured squeeze roll extending over said contoured surface of said metal strip between spaced substantially parallel contact faces of said contoured squeeze roll.

44. A method as claimed in claim 35 wherein weld energy is imparted to said free edge and said predetermined weld region by an electrical induction coil, said coil extending substantially around said metal strip in a plane substantially perpendicular to a longitudinal axis thereof.

45. A method as claimed in claim 35 wherein an elongate rod-like induction impeder supported at one end extends within a hollow interior cavity of said contoured surface to a region adjacent a closure region where said at least one free edge is fused to said surface of said metal strip.

* * * * *